United States Patent [19]
McKenna

[11] Patent Number: 5,473,242
[45] Date of Patent: Dec. 5, 1995

[54] BATTERY CONTACT AND METHOD OF RETENTION

[75] Inventor: Patrick M. McKenna, Mukilteo, Wash.

[73] Assignee: Intermec Corporation, Everett, Wash.

[21] Appl. No.: 150,397

[22] Filed: Nov. 10, 1993

[51] Int. Cl.$^6$ .................................................. H01M 10/48
[52] U.S. Cl. ............................... 320/2; 439/80; 439/366
[58] Field of Search ............................ 320/2, 5; 439/80, 439/84, 366, 627, 743, 744, 867

[56] References Cited

U.S. PATENT DOCUMENTS

| | | | |
|---|---|---|---|
| 4,558,270 | 12/1985 | Liautaud et al. | 320/2 |
| 5,138,245 | 8/1992 | Mattinger et al. | 320/2 |
| 5,259,769 | 11/1993 | Cruise et al. | 439/65 |

*Primary Examiner*—Peter S. Wong
*Assistant Examiner*—Edward Tso
*Attorney, Agent, or Firm*—Seed and Berry

[57] ABSTRACT

A battery contact generally having three integrally formed portions. A first spring portion at a first end is electrically couplable to a rechargeable battery pack. A second spring portion at a second end is electrically coupled to a battery charging circuit. A retaining spring portion is located therebetween. The first, second and retaining spring portions are formed by a series of bends made in and along a single, electrically conductive, flat metal wire. A housing containing the battery charging circuit has a socket for receiving the rechargeable battery pack. The first spring portion is mechanically and removably retained by the housing and projects into the socket. The second spring portion is positioned between a bottom wall of the housing and a printed circuit board containing the battery charging circuit. The second spring portion is electrically coupled to a printed circuit board contact and is formed to provide multiple bends with additive beam flexure forces.

9 Claims, 4 Drawing Sheets

BATTERY CONTACT AND METHOD OF RETENTION

DESCRIPTION

TECHNICAL FIELD

This invention relates to electrical contacts, specifically electrical contacts for intercoupling a rechargeable battery with a battery recharging circuit.

BACKGROUND OF THE INVENTION

Rechargeable batteries may be recharged in battery charging devices, allowing the rechargeable batteries to be reused after being drained of their electrical energy. Many battery charging devices currently available have electrical contacts for directly intercoupling the terminals of a rechargeable battery with a charging circuit in the charging device.

Often, several batteries are electrically interconnected and retained together within a housing to form a battery pack. The battery pack has external terminals which electrically couple with the electrical contacts of the battery charging device. The electrical contacts are typically affixed to a printed circuit board within the charging device, on which the charging circuit is built. As the recharging device is assembled during manufacture, the battery recharging contacts are soldered directly onto the printed circuit board. The electrical contacts are positioned at openings in a housing of the charging device so as to be contacted by the batteries or battery pack when placed into the housing for recharging.

This soldering and positioning of the electrical contacts is often performed manually, and thus is a costly, labor-intensive procedure. If an electrical contact breaks, the charging device must be disassembled, the broken electrical contact desoldered from the printed circuit board, and a new electrical contact soldered onto the circuit board. The electrical contacts must again be positioned at the opening in the housing for contact by the batteries or battery pack to be recharged. Replacement of an electrical contact in this manner is a labor-intensive and thus costly procedure.

SUMMARY OF THE INVENTION

According to principles of the present invention, a battery charging apparatus for charging a rechargeable battery pack includes a housing having a socket for releasably receiving the battery pack, a battery charging circuit retained adjacent to the housing, and a battery spring contact made of an electrically conductive material. The spring contact is releasably retained by the housing without soldering and has first and second spring portions. The first spring portion projects into the socket for electrical contact with the battery pack when inserted into the socket for recharging. The second spring portion is positioned between the housing and the battery charging circuit for electrical contact with the battery charging circuit.

The first spring portion has at least one bend in a first direction toward the socket and the second spring portion has a plurality of bends which flex and each apply a contact force between the spring contact and the battery charging circuit when the battery charging circuit is assembled. As a result, the second spring portion produces a contact force against the battery charging circuit greater than the contact force applied by the first spring portion against the battery pack when it is inserted into the socket.

The socket is defined by a bottom wall and a side wall of the housing, the side wall having a first channel formed therein opening toward the socket and sized to receive the first spring portion therein. The bottom wall has a second channel formed therein opening toward the battery charging circuit and is sized to receive the second spring portion therein. The first channel terminates in a pocket sized to receive a portion of the first spring portion. The second channel terminates in a pocket to receive a midportion of the spring contact between the first and second spring portions, the spring contact being retained within the first and second pockets when the battery charging circuit is removed from the housing.

The present invention solves the problems of prior recharging devices by providing a battery spring contact mechanically and removably self-retained by the housing of the battery charging apparatus. A portion of the battery contact extends within the housing and rests against a conducting surface on the battery charging circuit, electrically coupling the spring contact to the charging circuit without soldering or other fixing methods.

Other features and advantages of the present invention will become apparent from studying the following detailed description of the presently preferred exemplary embodiment, together with the following drawings.

DETAILED DESCRIPTION OF THE PRESENTLY PREFERRED EXEMPLARY EMBODIMENT

Figure 1:
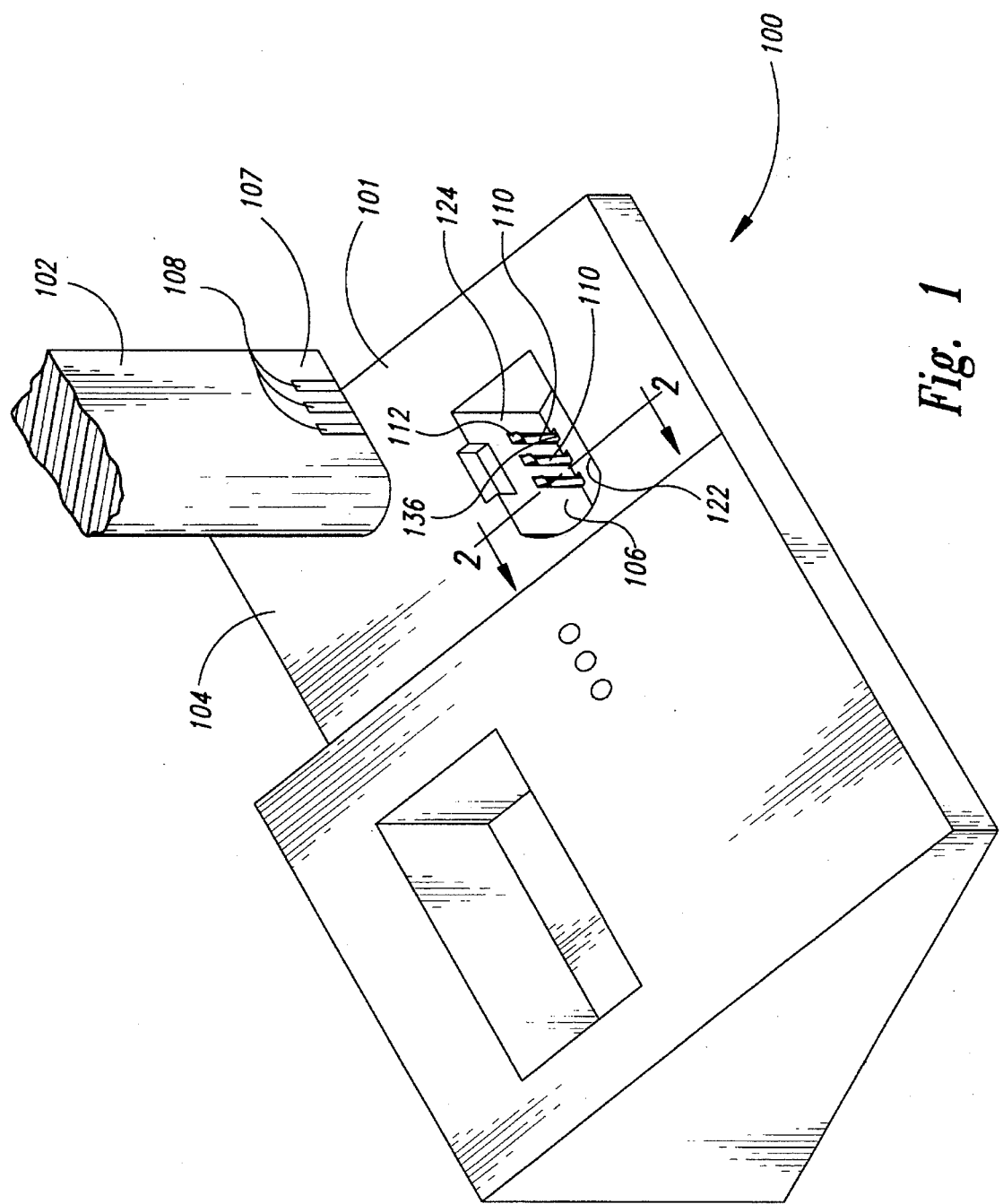
FIG. 1 is a fragmentary, isometric front view of a battery charging apparatus of the present invention.
Figure 2:
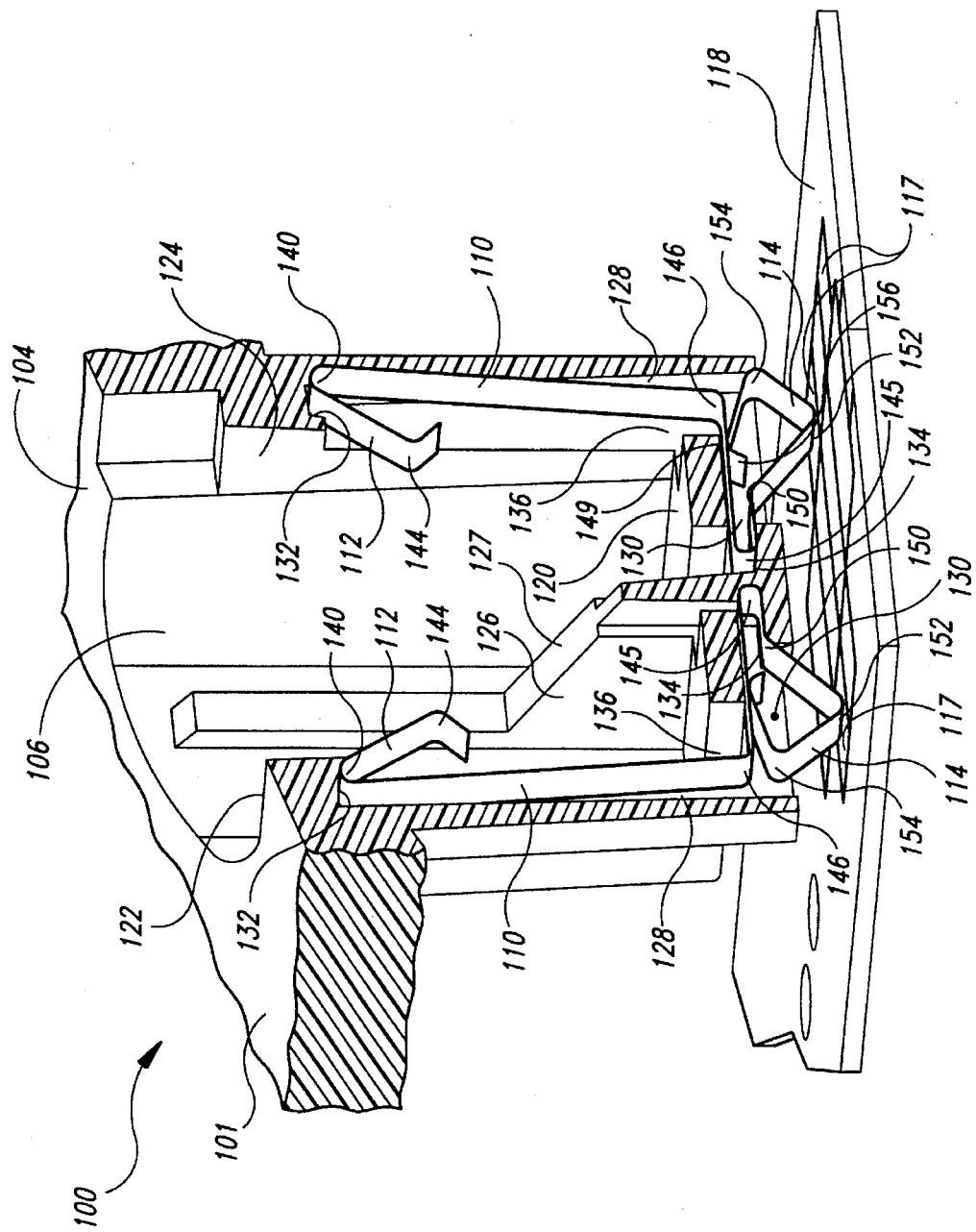
FIG. 2 is an enlarged, fragmentary, isometric cross-sectional view taken substantially along line 2—2 of FIG. 1.

As shown in the drawings for purposes of illustration, the present invention is embodied in a battery charging apparatus 100 for recharging a battery pack 102. As shown in FIG. 1, the battery charging apparatus 100 includes a housing 104 having a sloped top side 101. A receiving socket 106 is formed in the top side 101 of the housing 104 with a size to receive an end portion 107 of the battery pack 102. When inserted, a plurality of electrical contacts 108 on which both sides of the battery pack 102 are each placed in electrical contact with one of a corresponding plurality of socket contacts 110 protruding into the socket 106. In such manner, the battery pack 102 is electrically coupled to the battery charging apparatus 100 to allow the battery pack to be electrically charged.

Referring generally to FIGS. 2 through 6, the socket contacts 110 are retained by the housing 104, arranged in two sets of contacts on opposite sides of the socket 106. Each socket contact 110 has three lengthwise portions formed integrally from a single, electrically conductive material. A first spring portion 112 is at a first end of the socket contact 110 for making electrical contact with one of the contacts 108 of the battery pack 102. A second spring portion 114 is at a second end of the socket contact 110 for making electrical contact with a printed circuit board contact 117 on a printed circuit board 118 containing a battery charging circuit 119. A retaining spring portion 116 extending between the first and second spring portions 112 and 114 retains the socket contact 110 within the socket 106. The first spring portion 112 projects into the recess 106 in a position to engage one of the contacts 108 of the battery pack 102 when inserted into the socket 106 for recharging, while the second spring portion 114 is positioned below a bottom wall of the socket 106 and projects downward to engage one of the printed circuit board contacts 117 on the printed circuit board 118 positioned below the housing 104. The battery charging circuit 119 is of a type generally known and is typically formed on a printed circuit board. Those skilled in the relevant art may select from any such battery charging circuits suitable for use with the present invention. As used herein, "battery" or "batteries" refer to any form of energy storage device.

In addition to the bottom wall 120, the socket 106 in the housing 104 is defined by a front sidewall 122 and a rear sidewall 124. Because the end portion 107 of the battery pack 102 is sloped, a stabilizing rib 126 projects upward from the bottom wall 120 and has a correspondingly sloped upper edge wall 127 to stabilize and orient the battery pack 102 when the end portion 107 of the battery pack is fully inserted within the socket 106. The illustrated battery pack 102 has five contacts 108 on its end portion 107, two being positioned along one side and three being positioned along its opposite side. Therefore, the socket 106 is also provided with five socket contacts 110, two positioned along the front sidewall 122 and three along the rear sidewall 124 of the socket. While the following discussion will describe a single socket contact 110 located at the rear sidewall 124, the discussion herein applies to all of the four other socket contacts 110 retained within the socket 106.

The socket contact 110 is removably retained within a first channel 128 formed in the interior side of the rear sidewall 124 of the socket 106 and a second channel 130 formed in the underside of the bottom wall 120 of the socket. The channels 128 and 130 are sized to removably receive the battery contact 110 therein and limit its lateral movement. The first channel 128 extends upward along the interior side of the rear sidewall 124, opening toward the socket 106, and terminates in a downward facing pocket 132. The second channel 130 extends across the underside of the bottom wall 120, opening downward toward the printed circuit board 118 thereunder. The second channel 130 terminates at one end remote from the first channel 128 in a retaining pocket or shoulder 134. The first and second channels 128 and 130 join to form an aperture 136 opening upward into the socket 106. The first and second channels 128 and 130 are formed in the socket 106 approximately perpendicular to each other.

The socket contact 110, with its first and second spring portions 112 and 114, and retaining portion 116, is formed by making a series of bends in and along the length of the socket contact 110. The socket contact 110 is a single metal wire, preferably, flat wire. The first spring portion 112 has a first bend 140 with a first interior angle 142 when not flexed of approximately 45° which is positioned in the pocket 132 of the first channel 128. The first spring portion 112 has a second bend 144 toward its free end with an interior angle when not flexed of approximately 90°. The first bend 140 places the second bend 144 of the first spring portion 112 sufficiently away from the rear sidewall 124 and into the socket 106 so that the second bend 144 will contact one of the contacts 108 of the battery pack 102 when inserted into the socket for recharging and flex the second bend 144 back toward the rear sidewall. Because of the resiliency of the first bend 140, an adequate side contact force will be applied to maintain electrical contact between the contact 108 of the battery pack 102 and the socket contact 110. The second bend 144 provides a surface against which the contact 108 may slideably rest. The second bend 144 has the free end of the first spring portion 112 bent away from the battery pack 102, toward the rear sidewall 124, to prevent the free end from catching on or on entangling with the contact 108 of the battery pack 102 when the battery pack is inserted into or removed from the socket 106. The second bend 144 also decreases the possibility of breaking the first spring portion 112 as a result of the battery pack 102 being repeatedly inserted into and removed from the socket 106.

Figure 3:
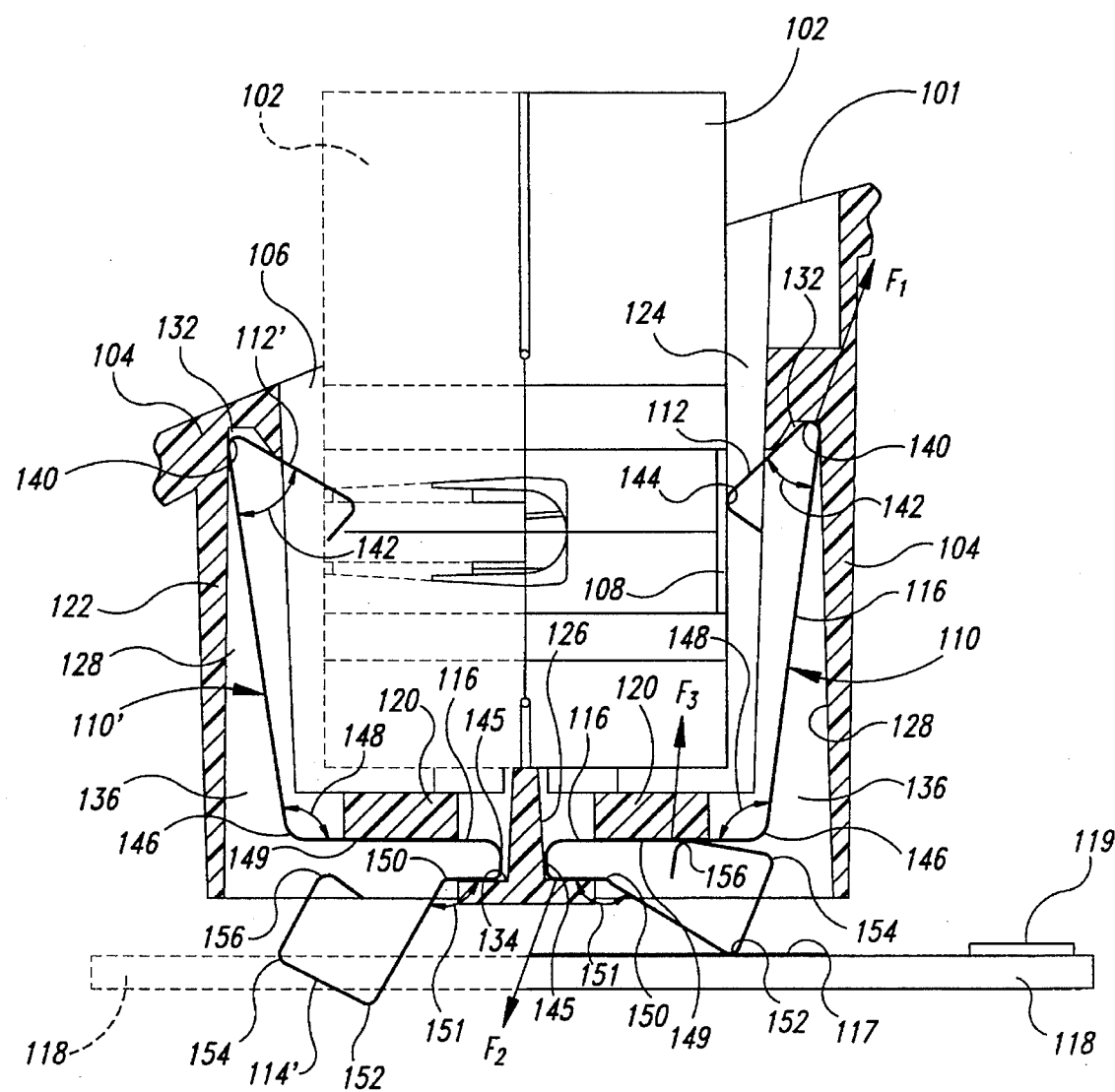
FIG. 3 is an enlarged, side elevational cross-sectional view taken along the line 2—2 showing the battery pack in the battery charging apparatus engaging a contact spring and another contact spring shown before being assembled in a compressed state for contact with a circuit board containing a charging circuit.
Figures 4, 5:
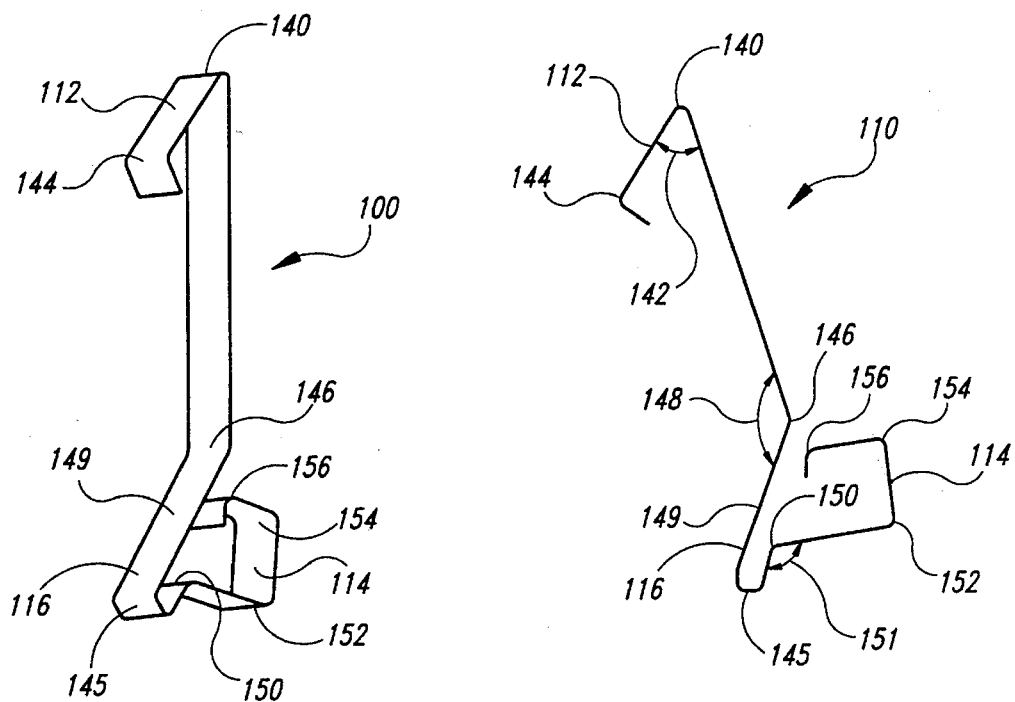
FIG. 4 is a reduced scale isometric view of one of the several battery contacts used in the battery charging apparatus of FIG. 1.
FIG. 5 is an enlarged side elevational view of the battery contact of FIG. 4.
Figure 6:
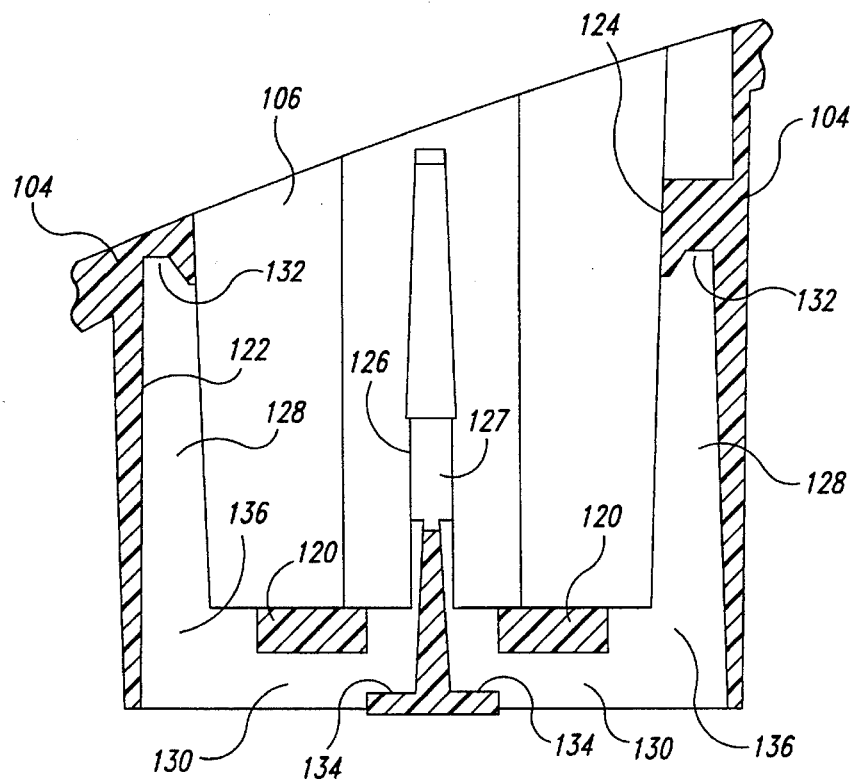
FIG. 6 is a cross-sectional view of the battery charging apparatus of FIG. 3 prior to assembly of the contact springs and printed circuit board.

The retaining spring portion 116 has a third bend 145 with an angle, when not flexed, of approximately 180° which is positioned in the retaining shoulder 134 of the second channel 130. When the socket contact 110 is assembled in the housing 104 with the first bend 140 in the pocket 132 and the third bend 145 engaging the retaining shoulder 134, the socket contact is self-retaining within the housing. When so self-retained, the socket contact 110 produces a force $F_1$ on pocket 132, a force $F_2$ on retaining shoulder 134 and a force $F_3$ on the bottom wall 120. The forces $F_1$ and $F_3$ are produced generally in opposite directions from the force $F_2$, as shown in FIG. 3, to retain the socket contact securely in place in the housing. The orientation of these forces $F_1$, $F_2$ and $F_3$ are such that they are neither countered nor upset by the operational forces encountered when the battery pack 102 is inserted in the socket 106 or the printed circuit board 118 is assembled with the housing 104 which both cause flexure of the socket contact 110. The third bend 145 has a sufficiently large radius of curvature so as to not produce undue stress on the socket contact 110 during manufacture, thereby reducing the danger of breaking the socket contact.

The retaining spring portion 116 further includes a fourth bend 146, formed between the first bend 140 and the third bend 145 with an interior angle 148, when not flexed, of approximately 140°. A leg 149 of the retaining spring portion 116 extends between the third and fourth bends 145 and 146. The fourth bend 146 provides a retaining spring force for the socket contact 110 to force the first bend 140 upward into the pocket 132, and third bend 144 downward and inwardly into the retaining shoulder 134, and the leg 149 upward against the bottom of the second channel 130.

The second spring portion 114 has fifth, sixth, seventh and eighth bends 150, 152, 154 and 156, respectively. The fifth bend 150 is positioned toward the third bend 145 and has an interior angle 151, when not flexed, of approximately 120°. The sixth, seventh and eighth bends 152, 154 and 156 each have an interior angle, when not flexed, of approximately 90°. The fifth bend 150 places the sixth bend 152 sufficiently below the bottom wall 120 so that the sixth bend will contact the printed circuit board contact 117 and flex the second spring portion 114 at the fifth bend 150 when the printed circuit board 118 is fixedly attached to the housing 104 during assembly of the battery charging apparatus 100. The printed circuit board 118 is spaced sufficiently close to the bottom wall 120 to flex the fifth bend 150 back toward the bottom wall. The resiliency of the fifth bend 150 provides a first contact force to maintain unfastened electrical contact between the sixth bend 152 and the printed circuit board contact 117 which results from a single beam cantilever flexure.

As noted above, upon assembly, the fifth bend 152 firmly engages the printed circuit board contact 117, and the assembly also moves the eighth bend 156 into engagement with the leg 149 and flexes the seventh bend 154. The resiliency of the seventh bend 154 provides a second contact force to maintain electrical contact between the sixth bend 152 and the printed circuit board contact 117 which results from a single beam cantilever fixture. The first and second contact forces produced by the flexure of the fifth bend 150 and the seventh bend 154 add together to provide increased force.

As assembly occurs, the sixth bend 152 also flexes and the resiliency of the sixth bend provides a third contact force to assist in maintaining electrical contact between the sixth bend and the printed circuit board contact 117 which results from a single beam cantilever flexure. This third contact force produced by flexure of the sixth bend 152 adds with the first and second contact forces produced by the fifth and seventh bends 150 and 154.

Bending the socket contact 110 to form the various bends described herein provides the second spring portion 114 with a spring force at least twice that of the first spring portion 112. The second spring portion 114 provides at least double-ended beam flexure (from the fifth and seventh bends 150 and 154), while the first spring portion 112 provides a single leg cantilever flexure (from the first bend 140).

FIG. 3 shows two socket contacts 110, the one contact 110 adjacent to the rear sidewall 124, with its first and second spring portions 112 and 114 in their flexed state, and the other contact 110' adjacent to the front sidewall 122 with its first and second spring members 112' and 114' in their relaxed state prior to assembly of the printed circuit board 118 to the underside of the housing 104 and the insertion of the battery pack 102 in the socket 106. The battery pack 102, and the printed circuit board 118, are partially shown in dashed lines on the side adjacent to the front sidewall 122 to show the position of the first and second spring members 112' and 114' relative thereto when in the relaxed state. Only the fourth bend 146 of the socket contact 110' is in its flexed state, thereby retaining the socket contact 110' within the socket 106. The socket contact 110 is shown in its fully relaxed state disassembled from the socket 106 in FIGS. 5 and 6.

Comparing the battery contact 110 when the battery charging apparatus is assembled with the unassembled state of the battery contact 110' in FIG. 3 shows how the second spring portion 114 provides a greater spring force than provided by the first spring portion 112. The fifth bend 150 of the socket contact 110 is flexed when the sixth bend 152 rests against the printed circuit board contact 117, increasing the third angle 151 beyond the unflexed 120°. Concurrently, the eighth bend 156 is moved upward and against the leg 149, flexing the seventh bend 154 inwardly and decreasing its interior angle below the unflexed 90°. As the housing 104 and the printed circuit board 118 are secured together, the second spring portion 114 is compressed inwardly on itself. The seventh bend 154 flexes inwardly and the eighth bend 156 presses upward against, and slides along, the leg 149, toward the third bend 145. The eighth bend 156 is bent away from the leg 149 to prevent the free end of the second spring portion 114 from scraping or catching on the leg 149 as the eighth bend 156 so slides.

The resulting spring forces of flexing the fifth and seventh bends 150 and 154 results in a downward force by the sixth bend 152 against the printed circuit board contact 117 of greater than 100 grams for each socket contact 110. While greater than 100 grams is a high force relative to other forces placed on the housing 104, stresses resulting from such a force are encountered only once during assembly of the battery charging apparatus 100 and remain constant thereafter while the second spring portion 114 rests in contact against the printed circuit board contact 117. The housing 104 and printed circuit board 118 are of sufficient rigidity and strength to minimize flexing from this high force.

The printed circuit board contact 117 is preferably made of tin and lead, which is standard on most printed circuit boards. To provide sufficient electrical conductivity between the socket contact 110 and the contact 117, without soldering or permanently coupling the socket contact 110 to the contact 117, a sufficiently great force must be exerted by the socket contact 110 onto the contact 117. Such a great force protects against fretting corrosion. Fretting corrosion is a corrosion invading the crystalline structure of metal, such as the metal of the socket contact 110, whereby any rubbing between the metal and another surface causes an oxide layer to form between the metal and the surface. This oxide layer decreases the conductivity between the metal and the surface. A gas-tight joint inhibits fretting corrosion. The high spring forces caused by the second spring portion 114, coupled with the secure stationary retention of the socket contact 110 within the housing 104, provides a long-lasting gas-tight joint that protects against fretting corrosion and maintains the initial conductivity between the socket contact 110 and the printed circuit board contact 117. Manufacturing the socket contact 110 from flat wire, as opposed to round wire, provides the sixth bend 152 with a greater surface to contact the printed circuit board contact 117, further improving conductivity.

The first spring portion 112 provides about one-half the spring force provided by the second spring portion 114. When the battery pack 102 is inserted within the socket 106, the first spring portion 112 is biased inwardly against the rear sidewall 124, decreasing the first angle 142 of the first bend 140 below the unflexed 45°. A lower spring force for the first spring portion 112 allows the battery pack 102 to be inserted and removed from the socket 106 with minimal force. Since the contacts 108 of the battery pack 102 are generally gold plated to thereby provide increased conductivity between them and the socket contacts 110, less spring force need be applied by the first spring portion 112 to provide the same conductivity therebetween as that provided between the second spring portion 114 and the printed circuit board contact 117. Thus, different spring forces are generated as required by the socket contact 110. The battery pack 102 is described in more detail in the concurrently filed U.S. patent application Ser. No. 08/150,484, filed Nov. 10, 1993, entitled TRIGGER SWITCH IN BATTERY PACK, incorporated herein by reference.

The process of installing the socket contact 110 into the socket 106 begins by securing the first bend 140 in the pocket 132. The aperture 136 is sufficiently large to permit the first spring portion 112 to be first inserted therethrough and into the first channel 128, from underneath the bottom wall 120. The retaining spring portion 116 is then inserted within the second channel 130, resting the third bend 145 against the retaining shoulder 134. Thereafter, the housing 104 may be fastened to the printed circuit board 118, moving the second spring portion 114 against the printed circuit board contact 117. The process is reversed for removing the socket contact 110 for replacement of the socket contact 110. The socket contacts 110 can be individually replaced as one or more should require replacement without replacing all of the socket contacts. Since the socket contact 110 can be replaced by hand without the need of a soldering tool, the socket contacts can be easily and inexpensively replaced in the field one at a time as required.

The design of the housing 104, the socket 106 and the socket contact 110, as shown and described herein, permits the socket contacts 110 to be readily, mechanically secured into, or removed from, the housing 104 by hand during assembly and disassembly without the need to solder or desolder the socket contact. Additionally, the socket contact 110 need not be fastened to the printed circuit board 118 by solder or other means.

As shown and described herein, the socket contact 110 may be readily manufactured on numerically controlled spring bending apparatus. The channels, apertures, pockets, shoulders and other features of the housing 104 have a sufficiently simple shape to permit the housing to be formed of rigid plastic in a single injection molding process. In the presently preferred embodiment of the invention the socket contact 110 is fabricated from $BeC_u$ alloy of 0.0070 inch thickness and an extra hard temper ("XHMS"). The socket contact 110 is nickel plated.

Although a specific embodiment of the invention has been described for purposes of illustration, various modifications may be made without departing from the spirit and scope of the invention, as is known by those skilled in the relevant art. Accordingly, the invention is not limited by the disclosure, but instead the scope is to be determined entirely by reference to the following claims.

I claim:

1. A battery charging apparatus for charging a rechargeable battery pack, the battery charging apparatus comprising:

a housing having a socket for releasably receiving the battery pack;

a battery charging circuit retained adjacent to the housing;

a spring contact of an electrically conductive material releasably retained by the housing without soldering the spring contact to the battery charging circuit, the spring contact having first and second spring portions, the first spring portion projecting into the socket for electrical contact with the battery pack when inserted into the socket for recharging, and a second spring portion being positioned between the housing and the battery charging circuit for electrical contact with the battery charging circuit;

the socket being defined by a bottom wall and a sidewall of the housing, the sidewall having a first channel formed therein opening toward the socket and sized to receive the first spring portion therein, and the bottom wall having a second channel formed therein opening toward the battery charging circuit and sized to receive the second spring portion therein;

the first channel terminating in a first pocket sized to receive a portion of the first spring portion, and wherein the second channel terminates in a second pocket sized to receive a midportion of the spring contact between the first and second spring portions, and the spring contact being retained within the first and second pockets when the battery charging circuit is removed from the housing; and the first and second spring portions being integrally formed by bends in the spring contact, the first spring portion having at least one bend in a first direction toward the socket and the second spring portion having a plurality of bends which flex and apply a contact force between the spring contact and the battery charging circuit when the battery charging apparatus is assembled to produce a contact force applied by the second spring portion against the battery charging circuit greater than the contact force applied by the first spring portion against the battery pack when inserted into the socket.

2. The battery charging apparatus according to claim 1 wherein the first and second spring portions have first and second spring forces, respectively, and wherein the first spring force is less than the second spring force.

3. The battery charging apparatus according to claim 1 wherein the spring contact is an approximately flat wire.

4. The battery charging apparatus of claim 1 wherein the second spring portion has at least three bends that flex to apply contact forces between the spring contact and the battery charging circuit.

5. The battery charging apparatus of claim 1 wherein the spring contact includes a midportion between the first and second spring portions, and the midportion is removably retained by the housing and the second spring portion has a first bend under flexure and a first leg extending toward the battery charging circuit between the first bend and a second bend which engages the battery charging circuit to provide electrical contact therewith, the second spring portion further including a third bend positioned away from the battery charging circuit to a same side as the first bend and a second leg extending between the second and third bends, and a third leg extending from the third bend toward and into operative engagement with the housing, the second and third bends being under flexure to produce a resultant contact force on the battery charging circuit at the second bend which is the resultant of the flexure forces produced by flexing of the first, second and third bends.

6. A battery spring contact for a battery charging device having a battery charging circuit and a housing, the housing having a first wall and a second wall defining a socket in the housing, the first wall having a first channel formed therein opening toward the socket and the second wall having a second channel formed therein opening toward the charging circuit, the battery spring contact comprising:

a first spring portion at a first end of the battery contact having first and second bends in a first direction, the first spring portion capable of being received by the first channel;

a second spring portion at a second end of the battery contact having third and fourth bends in a second direction, the second spring portion capable of unfastened electrical contact with the battery charging circuit; and a retainer portion between the first and second spring portions having a fifth bend, the first spring portion and the retaining portion capable of selectively, mechanically self-retaining the battery contract in the housing, the first spring portion, second spring portion and retainer portion being integrally formed of an electrically conductive material.

7. The battery spring contact of claim 6 wherein the second spring portion further includes a sixth bend in the first direction, and a seventh bend in the second direction.

8. The battery spring contact of claim 7 wherein the retainer portion includes an eighth bend in the first direction.

9. The battery spring contact of claim 6 wherein the battery contact is an approximately flat wire.

* * * * *

UNITED STATES PATENT AND TRADEMARK OFFICE
CERTIFICATE OF CORRECTION

PATENT NO. : 5,473,242
DATED : December 5, 1995
INVENTOR(S) : Patrick M. McKenna It is certified that error appears in the above-indentified patent and that said Letters Patent is hereby corrected as shown below:

In column 8, claim 6, line 63, delete "contract" and insert therefor --contact--.

Signed and Sealed this

Fourth Day of June, 1996

Attest:

BRUCE LEHMAN

Attesting Officer     Commissioner of Patents and Trademarks